United States Patent [19]

Seidel

[11] 4,238,684
[45] Dec. 9, 1980

[54] RADIATION DOSIMETER ASSEMBLY

[75] Inventor: John G. Seidel, McCandless, Pa.

[73] Assignee: Westinghouse Electric Corp., Pittsburgh, Pa.

[21] Appl. No.: 941,887

[22] Filed: Sep. 13, 1978

[51] Int. Cl.² .................. H05B 33/00; G01V 5/00
[52] U.S. Cl. ..................................... 250/484; 250/253
[58] Field of Search ................. 250/253, 337, 484

[56] References Cited

U.S. PATENT DOCUMENTS

| | | | |
|---|---|---|---|
| 3,243,590 | 3/1966 | Forsman et al. | 250/484 |
| 3,300,643 | 1/1967 | McCall | 250/484 |
| 3,419,720 | 12/1968 | Debye et al. | 250/337 |
| 3,471,699 | 10/1969 | McCall | 250/484 |
| 3,485,766 | 12/1969 | Yamashita et al. | 250/337 |
| 3,883,748 | 5/1975 | Nada et al. | 250/484 |
| 4,053,772 | 10/1977 | Felice | 250/337 |
| 4,064,436 | 12/1977 | Ward | 250/253 |
| 4,065,972 | 1/1978 | Holub et al. | 73/421.5 R |

Primary Examiner—Alfred E. Smith
Assistant Examiner—Janice A. Howell
Attorney, Agent, or Firm—M. P. Lynch

[57] ABSTRACT

A thin film radiation dosimeter is secured to a plate member exhibiting sufficient mechanical strength to function as a dosimeter support member and electrical resistance characteristics which permit the plate member to function as a heating element during the readout process of the radiation dosimeter.

1 Claim, 4 Drawing Figures

RADIATION DOSIMETER ASSEMBLY

BRIEF SUMMARY OF THE INVENTION

There is described herein with reference to the accompanying drawings a radiation dosimeter assembly typically mounted within a cup-like enclosure for uranium exploration applications, wherein a thin thermoluminescent radiation dosimeter is intimately disposed on the surface of a metal support member which exhibits sufficient mechanical strength to serve as a support member for the dosimeter and exhibits high electrical resistance characteristics which will permit it to function as the heating element during the readout process of the radiation dosimeter. A preferred embodiment consists of a Nichrome support member and a thin film of a thermoluminescent phosphor/binder composition disposed in intimate contact with a surface of the Nichrome support member.

In the readout process electrical current is passed through the Nichrome support member resulting in the heating of the Nichrome support member and the thermoluminescent dosimeter to a temperature of about 300° C. At this temperature the thermoluminescent phosphor material of the radiation dosimeter will emit light in proportion to the amount of radiation stored in the dosimeter.

An alternate radiation dosimeter assembly consists of a thin film thermoluminescent radiation dosimeter disposed in intimate contact with a Teflon support member. This dosimeter is contrasted with the conventional radiation monitoring badge used by personnel working within potentially dangerous nuclear radiation environments. The conventional badge is composed of a homogeneous mixture of a suitable phosphor material and binder to form cards having dimensions of approximately 32 mm×45 mm×0.4 mm. The thickness of the conventional card or badge renders it ineffective as an alpha responsive radiation dosimeter of the type described and illustrated in U.S. Pat. No. 4,053,772, titled LOCATING UNDERGROUND URANIUM DEPOSITS, assigned to the assignee of the present and incorporated herein by reference. This patent teaches the technique of monitoring radiation on the basis of alpha particles, and teaches that successful monitoring of alpha particles requires a thermoluminescent dosimeter/binder composition in a range of between approximately 1 and 3 mils in thickness. The patent discloses the preferred thermoluminescent phosphor/binder composition to consist of calcium sulfate:dysprosium as the thermoluminescent phosphor and Teflon as the binder. Thus, the successful application of the teachings of this patent to a personnel radiation monitoring badge is realized when an alpha sensitive radiation dosimeter composition of a thickness between approximately 1 and 3 mils is disposed in intimate contact with a surface of a Teflon support member wherein the combination corresponds in dimension to the above dimension of the conventional radiation monitoring badge. By conforming the dimensions of the newly disclosed alpha sensitive personnel radiation monitoring badge to the dimensions of the conventional radiation monitoring badge, the reading of the new alpha sensitive personnel radiation monitoring badge can be achieved through the use of the readout equipment designed for the above-identified conventional radiation monitoring badge.

DESCRIPTION OF THE PREFERRED EMBODIMENT

Thermoluminescent radiation dosimeters, sensitive to radon emanating from the earth, have found widespread use in uranium exploration applications. Typically, a thin, i.e., 1 to 3 mils, wafer-like radiation dosimeter is supported on a mechanical bracket within a cup-like member which is buried in an inverted position beneath the surface of the ground for a period of weeks. The radiation dosimeter is exposed to radiation emanating from the ground and develops a stored radiation dosage indicative of radon gas. The radiation dosimeter is temporarily secured to the mechanical bracket for installation in the cup-like enclosure. Following several weeks of exposure to radiation emanating from the earth, the radiation dosimeter is removed from the mechanical bracket and secured to a heating element in a radiation dosimeter readout apparatus. The thermoluminescent phosphor comprising the thermoluminescent radiation dosimeter responds to heating to a temperature of approximately 300° C. by emitting light which is indicative of the stored radiation. Following the readout process, the radiation dosimeter is removed from the heating element and is once again available for mechanical attachment to the support bracket of the cup-like enclosure.

Typical thermoluminescent radiation dosimeters are described in issued U.S. Pat. Nos. 3,883,748 and 3,471,699. A conventional readout process for the radiation dosimeter is described in U.S. Pat. No. 3,300,643. Illustrations of the positioning of the radiation dosimeter within a cup-like enclosure for subsurface uranium exploration can be found in U.S. Pat. Nos. 4,064,436 and 4,065,972.

An improved subsurface radiation dosimeter for uranium detection based on the sensitivity of the dosimeter to alpha particles is described in U.S. Pat. No. 4,053,772, issued Oct. 11, 1977, assigned to the assignee of the present invention and incorporated herein by reference.

An improved technique for handling the radiation dosimeter during the readout process to minimize physical deterioration of the dosimeter is described in pending U.S. patent application Ser. No. 928,641, filed July 27, 1978, titled IMPROVED HEATER DESIGN FOR READING RADIATION DOSIMETERS, and assigned to the assignee of the present invention.

Figure 1:
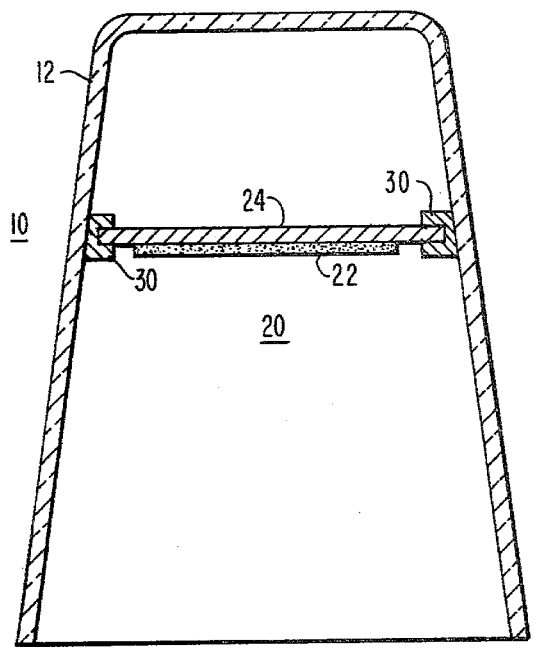
FIG. 1 is a sectional schematic illustration of an improved radiation dosimeter/support assembly secured within a typical cup-like enclosure used for uranium exploration.

Referring to FIG. 1, there is illustrated a cup-like radiation measuring apparatus 10 comprising an inverted cup-like enclosure 12 having an open end and a closed end, and a radiation dosimeter/support member assembly 20 secured within the cup-like enclosure 12 by spring clips 30 attached to the inside walls of the cup-like enclosure 12. The spring clips 30 allow for easy insertion and removal of the radiation dosimeter/support member assembly 20.

As contrasted with the prior art conventional techniques, wherein the radiation dosimeter and the mechanical support member are independent elements allowing for the attachment and removal of the dosimeter from the support bracket to permit removal of the radiation dosimeter element from the support bracket for the purposes of radiation readout, the radiation dosimeter/support member assembly 20 is single, integral combination of a radiation dosimeter 22 and a support member 24.

Unlike the prior art approach wherein the support members sole function was to provide a mechanical element for retaining the dosimeter within the cup-like enclosure, the support member 24 is constructed of a material which will not only provide the desired mechanical support, but exhibits high electrical resistivity such that the support member also functions as the heating element in the readout process for the radiation dosimeter 22. A particularly suitable material for implementing the support member 24 is Nichrome. Thus, the thermoluminescent radiation dosimeter 22 is integrally bonded or intimately secured to a surface of the support member 24 which more accurately can be referred to as a heater/support member, and the combination forming the radiation dosimeter/support member 20 forms a single integral unit which is inserted within the cup member 12 for the purposes of monitoring radiation, and is subsequently removed as a unit and positioned within a conventional readout apparatus for reading the light emitted by the dosimeter 22 in response to dosimeter heating provided by the support member 24 in response to electrical current flow through the support member 24.

Figure 2:
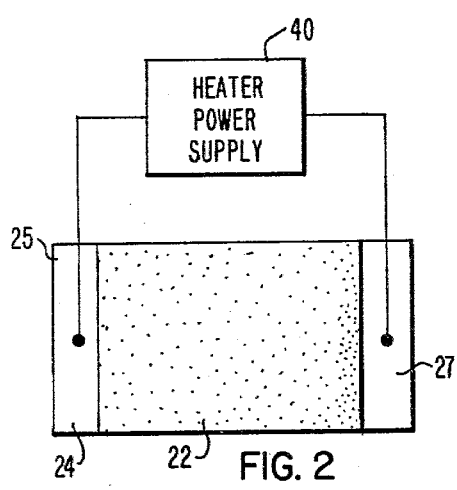
FIG. 2 is a top view of the radiation dosimeter/support assembly of FIG. 1.

Referring to FIG. 2, the radiation dosimeter 22 covers a central portion of the support member 24, allowing end portions 25 and 27 free of the radiation dosimeter 22 and available for electrical connection to the heater power supply 40. The current flow through the support member 24 produced by the heater power supply 40 establishes the support member 24 as a dosimeter heating element to affect the necessary heating of the radiation dosimeter in accordance with the conventional radiation dosimeter readout process. The intimate bonding of the radiation dosimeter 22 to a surface of the support member 24 can be achieved through several techniques, including the use of bonding or adhesive material such as polyimide.

Yet another technique which was found to be effective through detailed experimentation consists of the formulation of an emulsion of a desired thermoluminescent phosphor, i.e., $CaSO_4:Dy$, in an aqueous dispersion of a suitable binder such as Teflon. Following the spreading of the emulsion over a predetermined portion of a surface of the support member 24, the emulsion is heated to remove the water, and the resulting film is sintered to produce a strong, continuous radiation dosimeter film which is intimately bonded to the surface of the support member 24.

It has been disclosed in detail in U.S. Pat. No. 4,053,772, which has been incorporated herein by reference, that radiation can be measured on the basis of alpha particles, providing the thickness of the radiation dosimeter is maintained within critical dimensions, i.e., less than 3 mils. This teaching, coupled with the disclosure of a technique for forming the radiation dosimeter as an emulsion film, which, when heated and sintered, can form a large area uniform film within the critical thickness requirements for alpha particle sensitivity, permits the fabrication of an improved personnel radiation monitoring dosimeter badge. While the conventional personnel radiation dosimeter badge consists of a homogeneous mixture of a thermoluminescent phosphor and a binder to form a badge having a thickness of approximately 0.4 mm, the personnel radiation dosimeter badge disclosed in FIG. 3 utilizes a thin radiation dosimeter element film 42 comparable to dosimeter 22 of FIG. 1 integrally secured to a Teflon support member 44, as contrasted with the metal support member 24 of FIGS. 1 and 2.

Thus, while the binder material, i.e., Teflon, is used both as the binder for the radiation dosimeter film 42 and the support member 44, the dosimeter portion of the combination 46 is limited to the thin radiation dosimeter film 42, as contrasted with the prior art personnel radiation badge wherein the dosimeter consists of thermoluminescent phosphor/Teflon binder corresponding to the total thickness t of the combination 46. Thus, the radiation dosimeter film 42 is of a thickness between approximately 1 and 3 mils, whereas the combination 46 of the radiation dosimeter film 42 and the Teflon support member 44 is of a thickness t equal to 0.4 mm.

Figure 3:
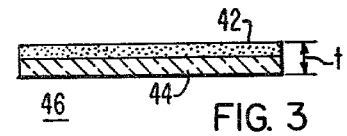
FIG. 3 is a sectional illustration of an alternate radiation dosimeter/assembly.
Figure 4:
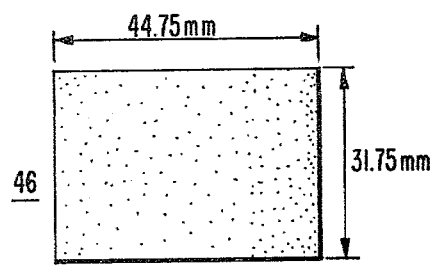
FIG. 4 is a top view of the assembly of FIG. 3.

Referring to FIG. 4, which is a top view of the combination 46 of FIG. 3, the length and width dimensions of the combination 46 are illustrated to be 31.75 mm and 44.75 mm, which correspond to the conventional dimensions of a personnel radiation monitoring badge, thus rendering the combination 46 totally compatible with the readout apparatus employed with the conventional radiation dosimeter badge.

What I claim is:

1. In a radiation measuring apparatus including a radiation dosimeter positioned within a cup-like housing, said dosimeter developing a stored radiation dosage in response to impinging radiation wherein the level of stored radiation dosage is measured as a function of light emitted by the radiation dosimeter in response to heating of the radiation dosimeter, the improvement of eliminating the handling of the radiation dosimeter when removing it from the cup-like housing and positioning it in contact with a heater to measure the stored radiation dosage, the improvement comprising, the integral combination of a thin film radiation dosimeter and a flat, elongated, substantially rigid heating member, wherein said substantially rigid heating member functions as a mechanical support member for the thin film radiation dosimeter while the integral combination is positioned within said cup-like housing to respond to impinging radiation, and further functions as a heating means during the measuring of the stored radiation dosage of said radiation dosimeter when said integral combination is removed from said cup-like housing.

* * * * *